US011725516B2

(12) United States Patent
Beck et al.

(10) Patent No.: US 11,725,516 B2
(45) Date of Patent: Aug. 15, 2023

(54) METHOD OF SERVICING A GAS TURBINE ENGINE OR COMPONENTS

(71) Applicant: Raytheon Technologies Corporation, Farmington, CT (US)

(72) Inventors: Sara Ann Beck, Manchester, CT (US); David Ulrich Furrer, Marlborough, CT (US); Vasisht Venkatesh, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 265 days.

(21) Appl. No.: 16/657,436

(22) Filed: Oct. 18, 2019

(65) Prior Publication Data

US 2021/0115794 A1    Apr. 22, 2021

(51) Int. Cl.
*F01D 5/00* (2006.01)
*B23P 6/00* (2006.01)
*C22F 1/18* (2006.01)

(52) U.S. Cl.
CPC .............. *F01D 5/005* (2013.01); *B23P 6/002* (2013.01); *C22F 1/183* (2013.01); *F05D 2220/323* (2013.01); *F05D 2230/72* (2013.01); *F05D 2300/174* (2013.01); *Y10T 29/49318* (2015.01); *Y10T 29/49723* (2015.01)

(58) Field of Classification Search
CPC ....... F01D 5/005; F05D 2230/72; B23P 6/002
See application file for complete search history.

(56) References Cited

U.S. PATENT DOCUMENTS

| 4,482,398 | A  | * | 11/1984 | Eylon ................... C22F 1/183 |
|           |    |   |         | 148/407                              |
| 7,338,631 | B2 | * | 3/2008  | Ishida ...................... C22C 9/00 |
|           |    |   |         | 420/492                              |
| 7,632,363 | B2 | * | 12/2009 | Yoshioka ................ C22F 1/10 |
|           |    |   |         | 148/677                              |
| 9,103,002 | B2 | * | 8/2015  | Decker .................. C22C 14/00 |
| 10,197,473 | B2 | * | 2/2019  | Diwinsky ............. F01D 21/003 |
| 10,323,312 | B2 |   | 6/2019  | Glavicic                              |
| 10,384,808 | B2 | * | 8/2019  | Bewlay ................ F01D 21/003 |
| 2006/0045785 | A1 |  | 3/2006  | Hu et al.                             |

(Continued)

FOREIGN PATENT DOCUMENTS

EP    1605074 A1    12/2005
EP    2444192 A2    4/2012

(Continued)

OTHER PUBLICATIONS

David Rugg, Adrian Sutton, Cold dwell fatigue in titanium alloys, CECAM, Apr. 14-16, 2014 (Year: 2014).*

(Continued)

*Primary Examiner* — Sarang Afzali
(74) *Attorney, Agent, or Firm* — Cantor Colburn LLP

(57) ABSTRACT

A method of servicing a gas turbine engine is disclosed. According to the method, a component including a titanium alloy is removed from the gas turbine engine after operating the gas turbine engine with the component in service. The removed component is subjected to heat treatment, and the heat-treated component is re-installed into the gas turbine engine or installed into a different gas turbine engine.

9 Claims, 3 Drawing Sheets

(56) References Cited

U.S. PATENT DOCUMENTS

| | | | | |
|---|---|---|---|---|
| 2007/0023142 | A1* | 2/2007 | LaGraff | F01D 5/005 |
| | | | | 156/345.31 |
| 2009/0308506 | A1* | 12/2009 | Barbier | C22F 1/183 |
| | | | | 148/669 |
| 2010/0108745 | A1 | 5/2010 | Heinz et al. | |
| 2012/0191496 | A1* | 7/2012 | Muench | G06Q 10/0631 |
| | | | | 705/7.13 |
| 2013/0179388 | A1* | 7/2013 | Agarwal | G06Q 10/06 |
| | | | | 706/47 |
| 2014/0286783 | A1* | 9/2014 | Derrien | F04D 29/02 |
| | | | | 148/670 |
| 2017/0306467 | A1* | 10/2017 | Stroud | C22C 14/00 |
| 2020/0056267 | A1* | 2/2020 | Li | A61L 27/50 |

FOREIGN PATENT DOCUMENTS

| | | | |
|---|---|---|---|
| EP | 3330186 | A | 6/2018 |
| EP | 3453484 | A1 | 3/2019 |
| WO | 2019168517 | A1 | 9/2019 |

OTHER PUBLICATIONS

European Search Report for European Application No. 20202145.7; Application Filing Date: Oct. 15, 2020 dated Mar. 3, 2021; 6 pages.

Bache; "A review of dwell sensitive fatigue in titanium alloys: the role of microstructure, texture and operating conditions"; International Journal of Fatigue; No. 25; 2003; pp. 1079-1087.

Cuddihy et al.; "On Cold Dwell Facet Fatigue in Titanium Alloy Aero-Engine Components"; International Journey of Fatigue; No. 97; 2017; pp. 177-189.

Zheng et al.; "Understanding Thermal Alleviation in Cold Dwell Fatigue in Titanium Alloys"; International Journey of Plasticity; No. 111; 2018; pp. 234-252.

European Office Action for EP Application No. 20202145.7, dated Feb. 22, 2023, pp. 1-5.

\* cited by examiner

METHOD OF SERVICING A GAS TURBINE ENGINE OR COMPONENTS

BACKGROUND

Exemplary embodiments of the present disclosure pertain to servicing of operational titanium alloy components in gas turbine engines, including gas turbine engines on aircraft.

Modern gas turbine engines are subject to demanding operating conditions involving significant levels of force. Components of the gas turbine engines such as fan blade rotors can be subject to damage that can shorten operational life of the engine or the components thereof, or can require costly repair or remanufacture of the gas turbine engine or the components thereof. In some cases, damage to the component(s) can result in catastrophic failure of the component(s) and accompanying failure of the engine and damage to the aircraft and risk to flight operations. Previous attempts to manage this risk have involved inspection of the gas turbine engine and the components thereof in the hopes of identifying damage such as cracks in metal alloys before they propagate to the point of causing failure of the component(s). However, such inspection regimens may not identify all damage, or may identify damage after a point at which repair is possible, which can lead to costly replacement of the component(s).

BRIEF DESCRIPTION

A method of servicing a gas turbine engine is disclosed. According to the method, a component comprising a titanium alloy is removed from the gas turbine engine after operating the gas turbine engine with the component in service. The removed component is subjected to heat treatment, and the heat-treated component is re-installed into the gas turbine engine or installed into a different gas turbine engine.

In addition to one or more of the features described above, or as an alternative to any of the foregoing embodiments, the removing of the component from the gas turbine engine can be performed in response to predetermined criteria of operating the gas turbine engine.

In addition to one or more of the features described above, or as an alternative to any of the foregoing embodiments, the predetermined criteria can include a cumulative time of operation of the gas turbine engine comprising said component.

In addition to one or more of the features described above, or as an alternative to any of the foregoing embodiments, the predetermined criteria can include a cumulative number of operation cycles of the gas turbine engine comprising said component.

In addition to one or more of the features described above, or as an alternative to any of the foregoing embodiments, the predetermined criteria can include a stress level applied to said component during operation of the gas turbine engine comprising said component.

In addition to one or more of the features described above, or as an alternative to any of the foregoing embodiments, the heat treatment can be performed below a beta transus temperature of the titanium alloy.

In addition to one or more of the features described above, or as an alternative to any of the foregoing embodiments, the component can be re-installed into the gas turbine engine or installed into a different gas turbine engine without mechanical repair of the component.

In addition to one or more of the features described above, or as an alternative to any of the foregoing embodiments, the component can be selected from a rotor hub or a bladed rotor hub.

In addition to one or more of the features described above, or as an alternative to any of the foregoing embodiments, the titanium alloy can include dislocations between metal grains in the titanium alloy.

In addition to one or more of the features described above, or as an alternative to any of the foregoing embodiments, the heat treatment annihilates the dislocations.

In addition to one or more of the features described above, or as an alternative to any of the foregoing embodiments, the titanium alloy can include soft grains oriented for slip and hard grains not oriented for slip.

In addition to one or more of the features described above, or as an alternative to any of the foregoing embodiments, the titanium alloy can include dislocations between the soft grains and the hard grains, and the heat treatment annihilates said dislocations.

In addition to one or more of the features described above, or as an alternative to any of the foregoing embodiments, the titanium alloy can include an alpha phase and a beta phase.

In addition to one or more of the features described above, or as an alternative to any of the foregoing embodiments, the titanium alloy can be selected from Ti-6Al-4V, Ti-6Al-6V-2Sn, Ti-6Al-2Sn-4Zr-2Mo, Ti 834 (5.8Al-4Sn-3.5Zr-0.7Nb-0.5Mo-0.3 Si-0.08C), Ti-1100 (6Al-2.75 Sn-4Zr-0.4Mo-0.45Si), Ti-811 (8Al-1Mo-1V), Ti-685 (6Al-5Zr-0.5Mo-0.25Si), or Ti-17 (5Al-2Sn-2Zr-4Mo-4Cr).

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
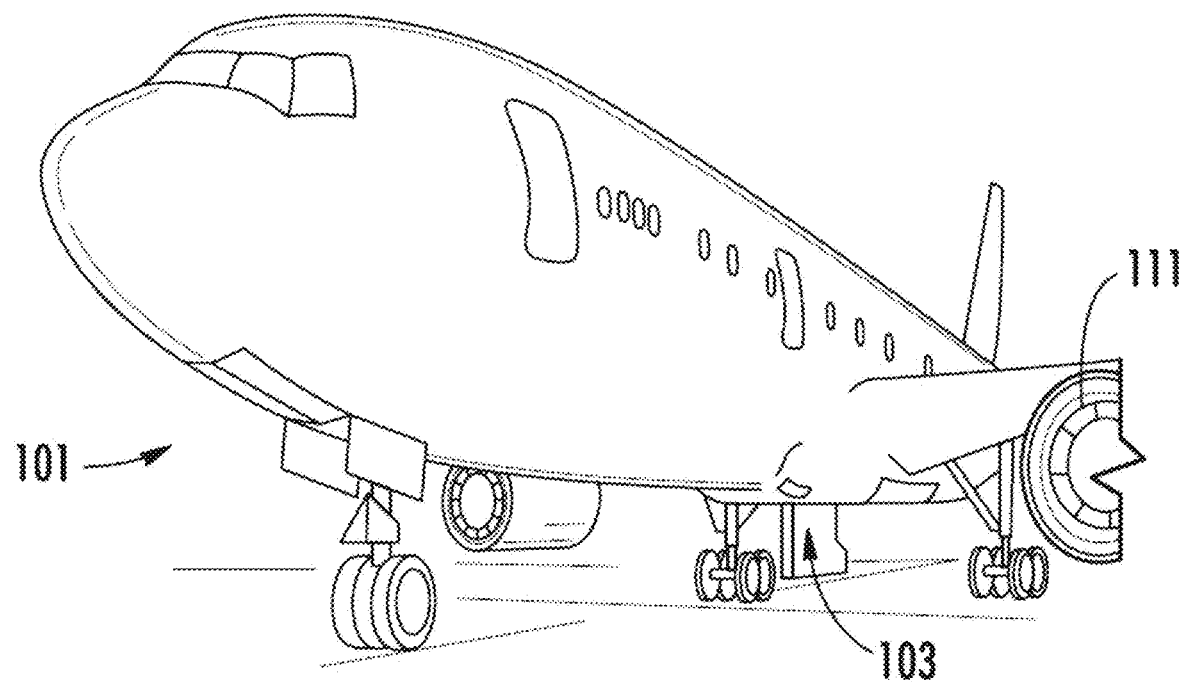
FIG. 1 is a schematic illustration of an aircraft that can incorporate various embodiments of the present disclosure.

As shown in FIG. 1, an aircraft includes an aircraft body 101, which can include one or more bays 103 beneath a center wing box. The bay 103 can contain and/or support one or more components of the aircraft 101. Also shown in FIG. 1, the aircraft includes one or more engines 111. The engines 111 are typically mounted on the wings 112 of the aircraft and are connected to fuel tanks (not shown) in the wings, but may be located at other locations depending on the specific aircraft configuration.

Figure 2:
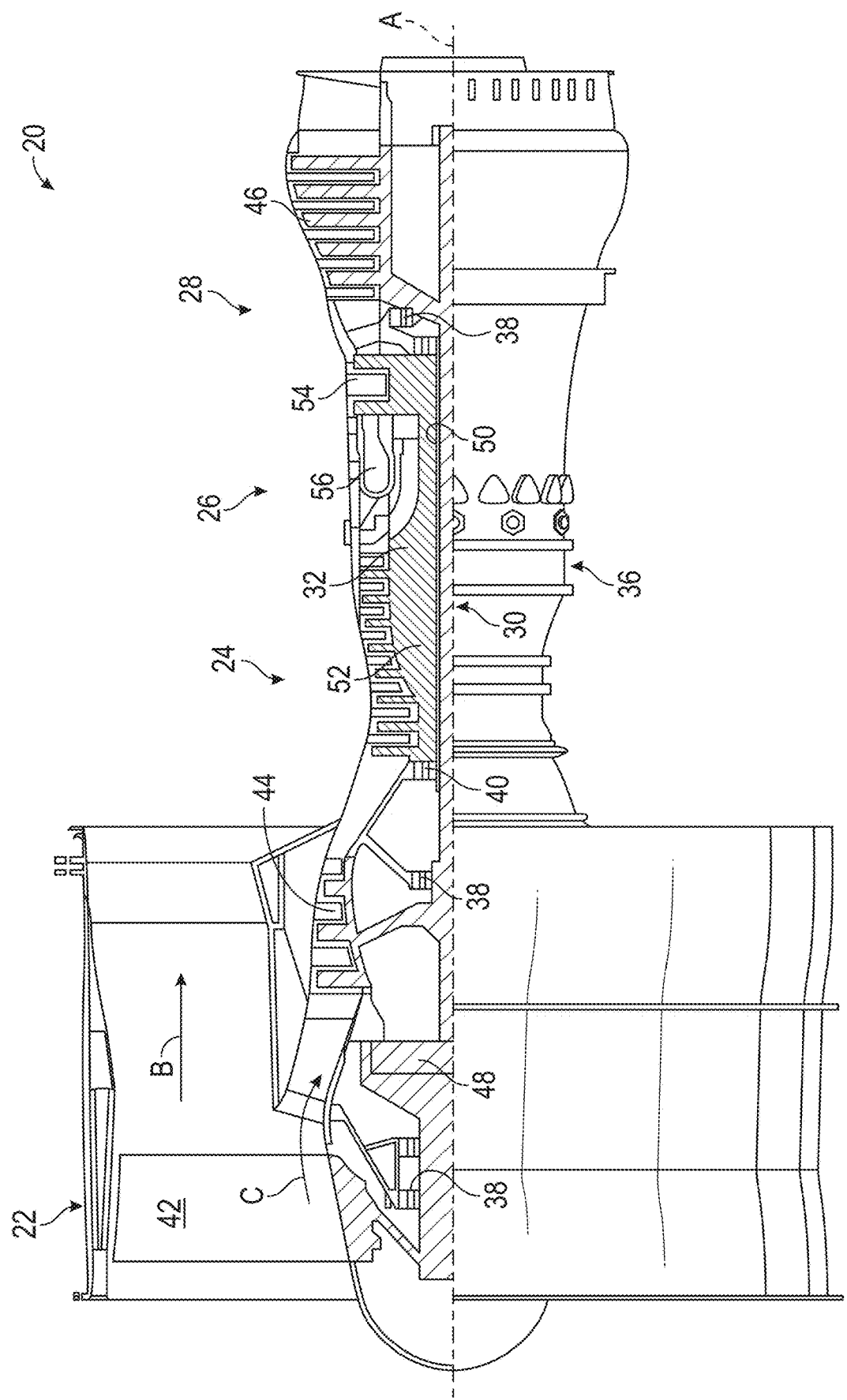
FIG. 2 is a partial cross-sectional view of a gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis. A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 3:
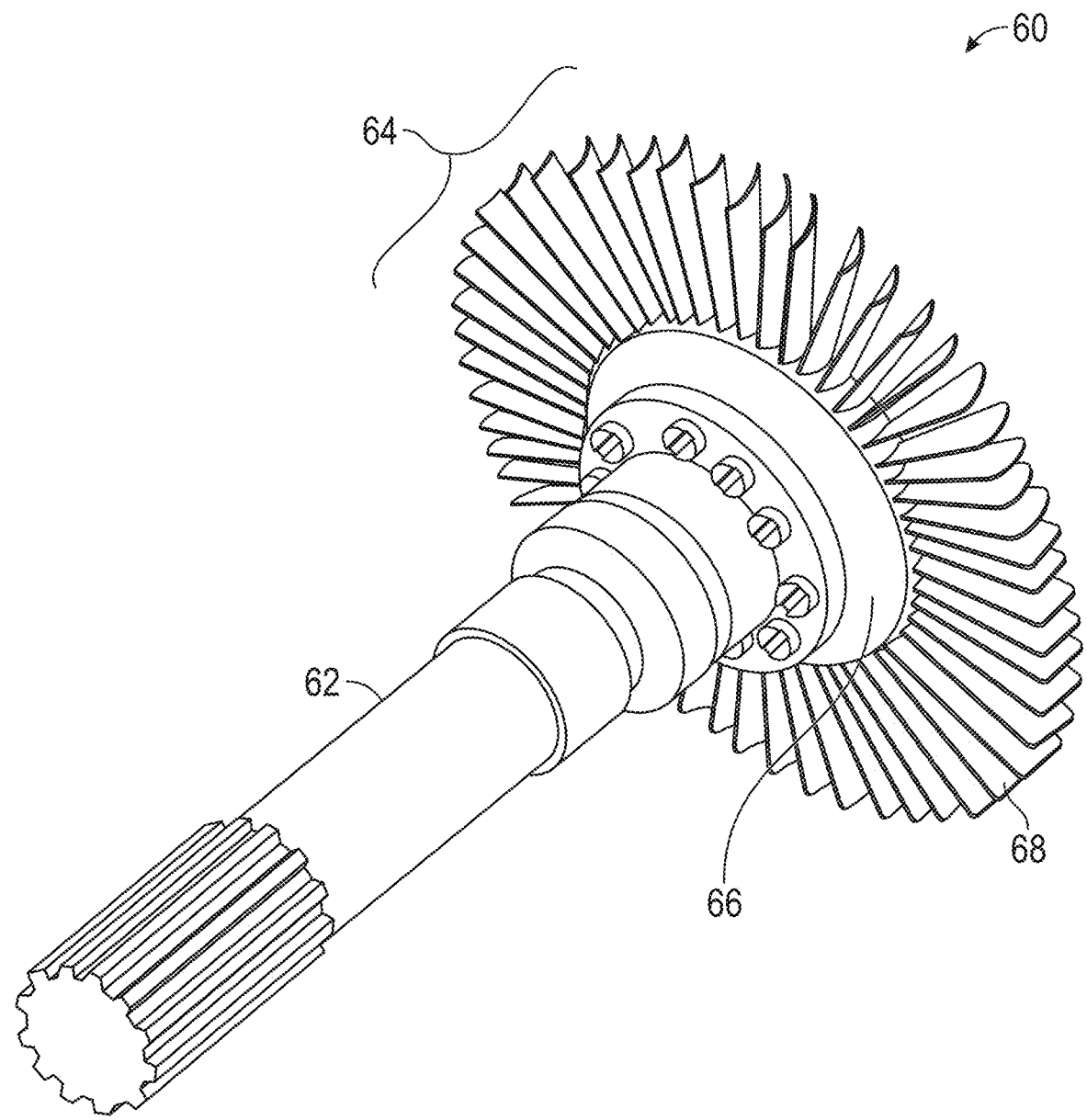
FIG. 3 is a perspective view of a gas turbine engine rotor.

As mentioned above, components of a gas turbine engine can be removed from service and subjected to heat treatment. In some aspects, the operation of the gas turbine engine in service can be on an aircraft, as operation of a gas turbine engine on an aircraft can expose engine component(s) to conditions that subject the component(s) to cold dwell fatigue as described in further detail below. In some aspects, the components to be serviced according to this disclosure include gas turbine engine rotor components. An example embodiment of a gas turbine rotor 60 is schematically shown in FIG. 3. As shown in FIG. 3, the example embodiment of a gas turbine rotor 60 includes a shaft 62, a bladed hub or rim 64 that includes a hub or rim 66 and airfoil blades 68. In some aspects, an engine component such as the gas turbine rotor 60 can be disassembled into sub-assemblies such as the shaft 62 and the bladed hub or rim 64, followed by heat treatment of such sub-assemblies. In other aspects, the entire component (e.g., the entire gas turbine rotor 60) can be subject to heat treatment. In still other aspects, only a portion of the engine component (e.g., areas around a weld joint) can be subjected to localized heat treatment. The component(s) to which heat treatment can be applied as disclosed herein can include various titanium alloys, including but not limited to multi-phase titanium alloys such as alpha-beta titanium alloys, and single phase alloys such as alpha titanium alloys, or near-alpha titanium alloys. Examples of titanium alloys to which heat treatment can be applied include but are not limited to Ti-6Al-4V, Ti-6Al-6V-2Sn, Ti-6Al-2Sn-4Zr-2Mo. Ti 834 (5.8Al-4Sn-3.5Zr-0.7Nb-0.5Mo-0.3Si-0.08C), Ti-1100 (6Al-2.75Sn-4Zr-0.4Mo-0.45Si), Ti-811 (8Al-1Mo-1V), Ti-685 (6Al-5Zr-0.5Mo-0.25Si), or Ti-17 (5Al-2Sn-2Zr-4Mo-4Cr).

The application of heat treatment can involve heating the component(s) to a temperature in a range having a low end of 600° F., 800° F., or 950° F., and an upper end of 1100° F., 1200° F., or 1300° F. The above range endpoints can be independently combined to produce a number of different ranges, and every possible range that can be formed by combination of the above endpoints is hereby expressly disclosed. In some aspects, the heat treatment is performed at a temperature that is below the beta transus temperature of the titanium alloy. In some aspects, a heat treatment temperature can be maintained for a duration in a range having a low end of 1 hour, 2 hours, or 3 hours, and an upper end of 6 hours, 7 hours, or 8 hours. The above range endpoints can be independently combined to produce a number of different ranges, and every possible range that can be formed by combination of the above endpoints is hereby expressly disclosed. The time and temperature are interrelated, with greater amounts of time generally required at lower temperatures and lower amounts of time required at higher temperatures. For example, 1-2 hours may be sufficient at temperatures of 1100° F.-1300° F. Heating can be provided by exposing the component(s) to a heat source such by placing the component(s) in a furnace or by other heating techniques such as conductive heating. The heat treatment temperature is generally provided at a level that should not have a significant impact to alter the basic grain morphology of the titanium alloy, so quenching protocol will generally not be critical for performance, and cooling of the alloy can be accomplished in whatever manner may be efficient for processing operations. For example, cooling can be provided by deactivating whatever heat source was used for the heat treatment, or by removing the heat source or removing the component(s) from the presence of the heat source, and allowing the component(s) to cool naturally and/or by assisting with convective cooling such as contacting the components with moving air from an air source such as a fan.

In some aspects, the heat treatment can be applied at service intervals for the gas turbine engine in which the component(s) are operated. Various criteria can be used to identify an interval for removal of the component(s) from the gas turbine engine and application of heat treatment. In some aspects, removal of the component(s) for application of heat treatment can be performed in response to predetermined criteria based on operation of the gas turbine engine. For example, in some aspects, the predetermined criteria can include a cumulative time of operation of the gas turbine engine. For example, in some aspects, an interval based on a cumulative time of operation can be a regular fixed interval or can be a variable interval that can be based on other variables including but not limited to total lifetime hours of operation of the engine in service (e.g., longer intervals earlier in the life of the engine and shorter intervals later in the life of the engine), number of engine operating cycles (e.g., with a greater number of cycles prompting a shorter interval), and/or operating conditions such as speed or temperature as further described below. In some aspects, the predetermined criteria can include a number of engine operating cycles (e.g., a startup to shutdown cycle). In some aspects, a predetermined criteria based on operating cycles can be in a range having a lower end of 200 cycles, 300 cycles, or 400 cycles, and an upper end of 2000 cycles, 3000 cycles, or 4000 cycles. The above range endpoints can be independently combined to produce a number of different ranges, and every possible range that can be formed by combination of the above endpoints is hereby expressly disclosed. In some aspects, the predetermined criteria, can include a stress and/or a temperature to which the component(s) are exposed during engine operation. Stress can be assessed indirectly, such as by monitoring engine speed or torque, both of which can be directly related to a level of stress on the engine components. For example, as described in more detail below, in some aspects the heat treatment can alleviate accumulated strain that may be influenced by speed or torque and/or temperature to which the components are subjected during engine operation. Any one or more of the above examples of predetermined criteria can be used by themselves or can be combined to identify a point at which the component(s) should be removed from operational service for application of heat treatment. For example, a prospective interval based on a cumulative number of hours of engine operation can be adjusted upward or downward based on whether the accumulated hours of engine operation or number of operating cycles occurred at engine speeds or torque and/or temperatures that were more or less likely to promote accumulation of strain in the titanium alloy. Data on any of the above criteria can be collected by a controller including a microprocessor operatively connected to sensors that can monitor the specified criteria. In some aspects, the microprocessor can be programmed with instructions for an algorithm that calculates an interval based on a variety of criteria, such as an algorithm in which points are accumulated based on operating conditions that can promote accumulation of strain, with higher point values applied to conditions that promote more strain accumulation (e.g., higher applied stress) and lower point values applied to conditions that promote less stress accumulation (e.g., lower applied stress). For example, an hour of operation at a low speed or torque may accumulate a specified point value whereas an hour of operation at a higher speed or torque may accumulate a higher point value, with heat treatment applied when accumulated points reach a predetermined threshold.

In some aspects, heat treatment can provide a technical effect of promoting annihilation of dislocations between grains in a titanium alloy's microstructure. Although this disclosure is not bound by any particular mechanistic theory, it is believed that such dislocations can form when a titanium alloy component is subjected to prolonged and/or cycled periods of stress at temperatures less than about 400° F., leading to a phenomenon of cold dwell fatigue. Unchecked, these dislocations can glide through soft grains in the alloy that are oriented for slip and unload stress onto hard grains that are not oriented for slip. Hard grains can be characterized as grains where the c-axis of the HCP (hexagonal close packed) crystal is oriented 0° to 25° with respect to the stress axis, and soft grains can be characterized as grains where the c-axis of the HCP crystal is oriented 70° to 90° with respect to the stress axis. Accumulation of dislocations at the hard grains can result in localized fields of high stress between the anisotropic distributions of soft and hard grains, resulting in reduced fatigue tolerance and ultimately the formation of cracks that can propagate to the point of a catastrophic failure of the component. Such dislocations can form in titanium alloys including single-phase grain structures such as alpha or near-alpha grain structures, but also in multi-phase titanium alloy grain structures such as two-phase alpha-beta grain structures that can be especially susceptible to this phenomenon at least in part because slip can cross boundaries between phases and also because the multiple phases can provide additional grain boundaries along which dislocations can accumulate.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of servicing a gas turbine engine, the method consisting of the following steps:
   removing a component comprising a titanium alloy from the gas turbine engine after operating the gas turbine engine with the component in service;
   subjecting the component to heat treatment in a range from 600° F. to 1,300° F.; and
   re-installing the component into the gas turbine engine or installing the component into a different gas turbine engine;
   wherein removing of the component from the gas turbine engine is performed in response to predetermined criteria of operating the gas turbine engine;
   wherein the titanium alloy includes soft grains oriented for slip and hard grains not oriented for slip;
   wherein prior to the heat treatment the titanium alloy includes dislocations at boundaries between the soft grains and the hard grains; and
   wherein the heat treatment annihilates the dislocations.

2. The method of claim 1, wherein data of the predetermined criteria of operating the gas turbine engine is collected by a controller including a microprocessor operatively connected to sensors that monitor the predetermined criteria.

3. The method of claim 1, wherein the predetermined criteria include a cumulative time of operation of the gas turbine engine comprising said component.

4. The method of claim 1, wherein the predetermined criteria include a cumulative number of operation cycles of the gas turbine engine comprising said component.

5. The method of claim 1, wherein the predetermined criteria include a stress level applied to said component during operation of the gas turbine engine comprising said component.

6. The method of claim 1, wherein the heat treatment is performed below a beta transus temperature of the titanium alloy.

7. The method of claim 1, wherein the component is selected from a rotor hub or a bladed rotor hub.

8. The method of claim 1, wherein the titanium alloy includes an alpha phase and a beta phase.

9. The method of claim 1, wherein the titanium alloy is selected from Ti-6Al-4V, Ti-6Al-6V-2Sn, Ti-6Al-2Sn-4Zr-2Mo, Ti 834 (5.8Al-4Sn-3.5Zr-0.7Nb-0.5Mo-0.3Si-0.08C), Ti-1100 (6Al-2.75Sn-4Zr-0.4Mo-0.45Si), Ti-811(8Al-1Mo-1V), Ti-685 (6Al-5Zr-0.5Mo-0.25Si), or Ti-17 (5Al-2Sn-2Zr-4Mo-4Cr).

* * * * *